United States Patent
Stuhrmann et al.

(10) Patent No.: US 11,358,238 B2
(45) Date of Patent: Jun. 14, 2022

(54) METHOD FOR LASER WELDING END FACES

(71) Applicant: Kirchhoff Automotive Deutschland GmbH, Attendorn (DE)

(72) Inventors: Jan Stuhrmann, Drolshagen (DE); Christian Dahmen, Rhode (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 353 days.

(21) Appl. No.: 16/487,383

(22) PCT Filed: Mar. 19, 2018

(86) PCT No.: PCT/EP2018/056833
§ 371 (c)(1),
(2) Date: Aug. 20, 2019

(87) PCT Pub. No.: WO2018/172254
PCT Pub. Date: Sep. 27, 2018

(65) Prior Publication Data
US 2019/0375047 A1    Dec. 12, 2019

(30) Foreign Application Priority Data
Mar. 20, 2017   (DE) .......................... 102017105900.8

(51) Int. Cl.
*B23K 26/16*     (2006.01)
*B23K 26/26*     (2014.01)
(Continued)

(52) U.S. Cl.
CPC .............. *B23K 26/16* (2013.01); *B23K 26/26* (2013.01); *B23K 26/322* (2013.01);
(Continued)

(58) Field of Classification Search
CPC .... B23K 26/16; B23K 26/26; B23K 2101/18; B23K 2103/04; B23K 2103/166; B23K 2101/006
(Continued)

(56) References Cited

U.S. PATENT DOCUMENTS

| | | |
|---|---|---|
| 368,635 A | 8/1887 | Wendell |
| 4,454,406 A | 6/1984 | Safonnikov et al. |

(Continued)

FOREIGN PATENT DOCUMENTS

| | | |
|---|---|---|
| CN | 1156075 A | 8/1997 |
| CN | 104439702 A | 3/2015 |

(Continued)

OTHER PUBLICATIONS

International Search Report dated Sep. 27, 2018 in parent PCT application PCT/EP2018/056833.

(Continued)

*Primary Examiner* — Jimmy Chou
(74) *Attorney, Agent, or Firm* — Polson Intellectual Property Law, PC; Margaret Polson; Christopher Sylvain (57) ABSTRACT

A method for laser welding the end faces of joints of two connecting flanges, which are held against each other, of two connecting partners made from a steel material, of which at least one is provided with a metallic coating with an evaporation temperature that is below the melting temperature of the steel material. The method is carried out such that, for the process of laser welding, the connecting flanges of the two connecting partners are held against each other enclosing an angle that opens pointing in a direction from the joint side on which the laser is applied, as a result of which a degassing gap, which increases in the direction of heat introduction, is provided between the connecting flanges, through which (Continued)

degassing gap evaporation products of the coating material resulting from the introduction of heat are carried off.

13 Claims, 4 Drawing Sheets

(51) Int. Cl.
  *B23K 26/322* (2014.01)
  *B23K 101/18* (2006.01)
  *B23K 103/04* (2006.01)
  *B23K 101/34* (2006.01)
  *B23K 103/16* (2006.01)
  *B23K 101/00* (2006.01)

(52) U.S. Cl.
  CPC .... *B23K 2101/006* (2018.08); *B23K 2101/18* (2018.08); *B23K 2101/34* (2018.08); *B23K 2103/04* (2018.08); *B23K 2103/166* (2018.08)

(58) Field of Classification Search
  USPC .................................................. 219/121.63
  See application file for complete search history.

(56) References Cited

U.S. PATENT DOCUMENTS

| | | | | |
|---|---|---|---|---|
| 4,866,242 | A * | 9/1989 | Martyr | B23K 26/24 219/121.64 |
| 4,924,063 | A * | 5/1990 | Buchel | B23K 26/04 219/121.64 |
| 5,603,853 | A * | 2/1997 | Mombo-Caristan | B23K 15/006 219/121.64 |
| 5,760,365 | A * | 6/1998 | Milewski | B23K 26/123 219/121.64 |
| 5,828,033 | A * | 10/1998 | Mitsuyoshi | B23K 26/206 219/121.64 |
| 5,841,097 | A * | 11/1998 | Esaka | B23K 26/067 219/121.63 |
| 6,191,379 | B1 * | 2/2001 | Offer | B23K 9/0213 219/121.63 |
| 6,300,591 | B1 * | 10/2001 | Fuerschbach | B23K 26/242 228/183 |
| 6,380,509 | B1 * | 4/2002 | Arlt | B23K 26/28 219/121.63 |
| 6,521,511 | B1 | 2/2003 | Inoue et al. | |
| 8,607,457 | B2 * | 12/2013 | Huemmer | F16K 27/10 29/890.129 |
| 9,862,058 | B2 * | 1/2018 | Breuer | B23K 35/0261 |
| 10,543,565 | B2 * | 1/2020 | Breuer | B32B 15/012 |
| RE47,904 | E * | 3/2020 | Breuer | B23K 26/322 |
| 2001/0047983 | A1 * | 12/2001 | Degawa | B23K 26/244 219/121.64 |
| 2002/0144984 | A1 * | 10/2002 | Mori | B23K 26/244 219/121.64 |
| 2002/0195431 | A1 * | 12/2002 | Rippl | B23K 26/1488 219/121.5 |
| 2004/0173587 | A1 * | 9/2004 | Musselman | B23K 26/0093 219/121.64 |
| 2005/0224470 | A1 * | 10/2005 | Burt | B23K 26/1437 219/121.63 |
| 2006/0000812 | A1 * | 1/2006 | Weber | B23K 26/0643 219/121.61 |
| 2006/0175301 | A1 * | 8/2006 | Rippl | B23K 26/0884 219/121.8 |
| 2007/0051703 | A1 * | 3/2007 | Neff | B23K 9/173 219/74 |
| 2008/0245777 | A1 * | 10/2008 | Cremerius | B23K 26/40 219/121.64 |
| 2011/0139753 | A1 * | 6/2011 | Lee | B23K 26/244 219/121.64 |
| 2012/0006795 | A1 * | 1/2012 | Nowak | B23K 26/26 219/121.64 |
| 2012/0211474 | A1 * | 8/2012 | Hayashimoto | B23K 26/28 219/121.64 |
| 2013/0087540 | A1 * | 4/2013 | Gu | B23K 26/354 219/121.64 |
| 2013/0236239 | A1 * | 9/2013 | Brandt | B23K 26/32 403/270 |
| 2014/0076866 | A1 * | 3/2014 | Gramsch | B23K 26/244 219/121.64 |
| 2015/0083697 | A1 * | 3/2015 | Roos | B23K 26/082 219/121.61 |
| 2015/0306702 | A1 * | 10/2015 | Breuer | C22C 38/002 219/121.64 |
| 2015/0314392 | A1 * | 11/2015 | Haschke | B23K 26/043 219/121.64 |
| 2016/0039046 | A1 * | 2/2016 | Franz | B23K 26/034 219/121.64 |
| 2017/0080523 | A1 * | 3/2017 | Andersson | B23K 28/02 |
| 2017/0368635 | A1 * | 12/2017 | Hanschmann | B23K 26/082 |
| 2018/0117712 | A1 * | 5/2018 | Stuhrmann | B23K 26/322 |

FOREIGN PATENT DOCUMENTS

| | | | | |
|---|---|---|---|---|
| DE | 19523005 A1 | 1/1996 | | |
| DE | 102008033113 A1 | 1/2010 | | |
| DE | 102012104362 A1 * | 8/2013 | ............ | B23K 26/10 |
| DE | 102012104362 A1 | 8/2013 | | |
| DE | 102013107228 B3 | 4/2014 | | |
| DE | 102013110523 A1 | 3/2015 | | |
| EP | 0771605 A2 | 5/1997 | | |
| EP | E P-0771605 A2 * | 5/1997 | .......... | B23D 35/001 |
| EP | 2985209 A2 | 2/2016 | | |
| GB | 874271 | 8/1961 | | |
| JP | 4232024 B2 | 3/2009 | | |
| WO | 2016169791 A1 | 10/2016 | | |
| WO | WO-2016169791 A1 * | 10/2016 | ........... | B23K 26/082 |

OTHER PUBLICATIONS

Written Opinion of the International Searching Authority dated Sep. 27, 2018 in parent PCT application PCT/EP2018/056833.
Schmitt, F., et al., "Laser Beam Micro Welding With High Brilliant Fiber Lasers", Journal of Laser Micro/Nanoengineering, vol. 5, No. 3, pp. 197 to 203, Dec. 1, 2010.
Mehlmann, B., et al., "Laser micro welding for ribbon bonding", Physics Procedia, vol. 56, pp. 776 to 781, Jan. 1, 2014.
Müller, A., et al., "Laser beam oscillation for fillet welding", Welding in the World, vol. 58, No. 6, pp. 865 to 872, Nov. 1, 2014.
Office Action dated Jan. 26, 2021 in related Chinese application 201880018706.7.
Office Action dated Oct. 9, 2021 in related Chinese application 201880018706.7.

\* cited by examiner

METHOD FOR LASER WELDING END FACES

BACKGROUND

The present disclosure relates to a method for laser welding the end faces of joints of two connecting flanges, which are held against each other, of two connecting partners made from a steel material, of which at least one is provided with a metallic coating with an evaporation temperature that is below the melting temperature of the steel material.

There are numerous applications in which connecting flanges of metal components, held against each other with their flat sides, are welded together at their end faces—the mutually parallel end faces of the connecting flanges. In many cases, laser welding will be used to this end. The connecting flanges of the connecting partners can be adjoining end regions following the longitudinal extension of the joints, for example of sheet metal workpieces or regions of such a workpiece that are bent or crimped to form the connecting flanges. In order to perform the welding of the end faces, the connecting flanges are fixed to each other in a suitable manner, for example by means of a suitable clamping device, and in particular as long as the welding is performed.

DE 10 2013 107 228 B3 discloses the laser welding of end faces of connecting flanges of two connecting partners, the connecting partners being sheet steel parts. In the case of the laser welding method known from this document, provision is made for a lower energy input to be applied to a central region of the weld and for a higher energy input in the adjoining edge regions which are located within the joints. In order to be able to weld over the desired joint width, the welding laser beam is oscillated back and forth transversely to the feed direction. In this prior art method, this welding laser beam movement is also used to introduce the different energy input required across the cross section of the weld, by the fact that in the edge regions of the weld, in which the weld is to be performed with a higher energy input, the residence time and/or the energy of the laser beam is increased. It is hereby achieved that the weld zone in these regions can be introduced relatively deep into the joints.

The problem with welding sheet steel components, especially in the field of automotive body construction, is that the sheet metal components are provided with a metallic coating. This may be a corrosion-inhibiting coating, for example a zinc coating. Typically, such a zinc coating is performed by hot-dip galvanizing or electrolytic galvanizing. The problem with joining such sheet metal components is that the melting point and also the evaporation temperature of the metallic coating is significantly lower than the melting temperature of the steel material. This has the consequence that when welding two workpieces in which at least one connecting partner has a metallic coating with an evaporation temperature which is below the melting temperature of the steel material, as is the case for the example with a zinc coating, the coating material spontaneously evaporates in an explosive manner, as a result of the introduction of heat required for welding. In the case of a zinc coating, this is also referred to as zinc degassing. The result is an increased spattering, wherein also parts of the molten weld pool are removed and cause increased porosity in the weld. This porosity can be explained by the fact that the evaporated zinc cannot degas unhindered. In addition, the welding process causes residual stresses in the weld. In combination with the given diffusion possibilities, the remaining liquid zinc can embrittle the weld by the so-called "Liquid Metal Embrittlement" (LME). In this respect, such a weld generally does not meet the strength requirements otherwise imposed on the welded component, in particular if the load is oscillating or dynamic, since material embrittlement entails an increased risk of cracking.

In the case of the welding method disclosed in DE 10 2013 107 228 B3, a gap between the connecting flanges of the connecting partners must be maintained when welding galvanized sheets. This gap size should neither be too big nor too small. In order to maintain the gap over the length of the joints, corresponding high demands are imposed on the clamping device. Moreover, in this method, it is unavoidable that a part of the laser energy is lost, namely that portion of the laser beam which passes through the gap between the connecting partners.

WO 2016/169791 A1 discloses a method by means of which two such connecting partners can be welded together in the region of their connecting flanges by laser welding on the end faces with a reduced problematic zinc degassing. In this prior art method, the weld pool is kept in a liquid state for a longer time by a laser beam oscillating transversely to the feed direction with a frequency between 80 Hz and 1000 Hz. In addition, the laser beam oscillation introduces a certain dynamic into the weld pool. Both measures facilitate a controlled degassing process through the weld pool. However, as the sheet thickness increases, so does the required weld depth. As a result, the presence of two zinc-coated connecting partners makes it increasingly difficult to allow the degassing process to proceed to completion or in a controlled manner, since the zinc has to travel an ever-increasing distance to the surface. Even if connecting partners can be laser-welded at the end faces using this method, at least one of which has a coating with an evaporation temperature below the melting temperature of the steel material, the feed rate in particular is limited by the necessary laser oscillation transversely to the feed direction. Correspondingly more time must be provided for the laser welding process in a series production.

SUMMARY

Proceeding from this background, an aspect of the present disclosure is therefore a method for laser welding the end faces of the joints of two connecting flanges, which are held against each other, of two connecting partners made from a steel material, in such a way that the welds can be performed with a larger feed rate and a more effective coating degassing while avoiding pore formation and LME and thus can be faster than in the method known from WO 2016/169791 A1.

This is achieved according to the present disclosure by the above said method, in which for the process of laser welding, the connecting flanges of the two connecting partners are held against each other enclosing an angle that opens pointing in a direction from the joint side on which the laser is applied, as a result of which a degassing gap that increases in the direction of heat introduction is provided between the connecting flanges, through which degassing gap evaporation products of the coating material resulting from the introduction of heat are carried off.

The term "connecting flange" used in the context of the present discussion represents the edge portion of a connecting partner with which it is connected to the connecting flange of the other connecting partner. Thus, the connecting flange of a connecting partner represents its portion, which, starting from the adjacent joint, corresponds to the penetration depth of the material melted by the welding.

In this method, in contrast to prior art methods, the connecting partners are not parallel with their sides facing each other but are held at an angle to each other. The included angle opens in the direction away from the joint side on which the laser is applied. In this position of the connecting flanges to each other, the laser welding is performed. Due to the angled position of the connecting flanges, a degassing gap extending away from the location of the current melting, which proceeds in the direction of the weld seam depth and has an increasing width, is provided. Due to this, evaporation products of the coating material resulting from the introduction of heat are carried off. This does not mean that no evaporation products are removed from the coating material in the direction of the side on which the laser is applied, but that the evaporation products are in any case removed for the most part in a controlled manner through the degassing gap. For the removal of the degassing products, a passage is created by the above-described geometry of the degassing gap, which provides a lower resistance to the flow of evaporation products than in the case of a degassing occurring through the weld pool. Therefore, the evaporation products are carried away through the degassing gap, at least for the most part, in particular away from the connecting zone. In the method according to the present disclosure, the entire laser energy can be introduced into the material to be melted.

It is assumed that, in the context of the present discussion, it is the first time that two connecting flanges to be welded on the side of their end faces are not arranged parallel to one another. The parallel arrangement of connecting flanges, which must have a sufficient width, was—according to prevailing opinion—a guarantee that a melt through of the weld was prevented. It was therefore surprising to note that with the same laser intensity setting, even with the above-described angled arrangement of the connecting flanges to each other to form the degassing gap, a melt through was not observed and the quality of the created weld was significantly improved. This is attributed to the cleverly provided degassing passage, which discharges the evaporation products of the metallic coating in the direction of propagation of the laser beam and not in the opposite direction, in which the evaporation products have to traverse the liquid weld pool. Nevertheless, the connecting partners can adjoin each other in the region of the joints, for example with the mutually facing abutting edges. A loss of laser energy is therefore reduced to a minimum. In this method, it is therefore in principle not necessary to keep the weld pool liquid for a longer period of time.

The afore-described angled arrangement of the mutually facing connecting flanges for forming the degassing gap permits a configuration of the connecting flanges such that they are held adjacent to and against each other, for performing the connecting process, only over a linear contact or an almost linear contact. Thus, evaporation products of the metallic coating can be removed already at the onset of welding through the degassing gap. At the same time, the linear contact and the weld pool formed along the linear contact form an effective barrier to the evaporation products of the coating. Due to the inclined arrangement of the mutually facing sides of the connecting flanges, the laser beam directed onto the adjoining joints causes the coated surface to be preheated in the direction of the depth of the forming weld seam, either by the laser beam and its reflections on the mutually facing sides of the connecting partner and/or due to the weld pool, which "eats its way" deeply with a heat front preceding the same. As a result, the connecting flanges and in particular the metallic coating are heated and are brought to the evaporation temperature of the metallic coating before the steel material melts this region.

The degassing gap formed by the above-mentioned holding together of the connecting flanges represents the passage through which the degassing products are removed, which occurs automatically due to the pressure arising during evaporation. In the method according to the present disclosure, the melt remains largely free of evaporation products, so that the weld has a very low porosity or is even pore-free. As a result, the quality of the formed weld seam is outstanding and satisfies the highest static requirements even under oscillating and dynamic loads. In this method, since degassing of the metallic coating does not occur through the weld pool, it generally does not need to be kept liquid for a time longer than required for melting the steel material in order to achieve a controlled degassing process. As a result, in this method, the laser beam can be moved with a correspondingly high feed rate. Investigations have shown that this method can be carried out at feed rates of more than 10 m/min.

The angled arrangement of the mutually facing sides of the connecting flanges for forming the degassing gap can be brought about by the corresponding arrangement of the connecting partners in the case of straight connecting flanges. It is also possible for at least one of the two connecting partners to be angled or curved in the region of its connecting flange, and for the joint ending the bend to be the one which is held against the joint of the other connecting partner for the laser welding process. Another advantage of such an arrangement of the connecting flanges relative to one another is that they can be clamped in the angled arrangement with simple means. In contrast to the prior art, they do not need to be clamped over their parallel adjoining sides. Rather, it is possible to fix one of the two connecting flanges and to press the latter against the former to create the desired linear contact, in order to compensate for possible tolerances.

An advantage of this method is not only the particular quality of the weld seam which sets in despite welding of metal-coated connecting partners and the possible high welding speed, but also that the connecting flanges only need to have a width which corresponds to the depth of the weld seam. Consequently, these can be kept very narrow. As a result, the weight of the component formed from the connecting partners, for example a structural component for a vehicle, can be reduced. At the same time, the installation space required by such a component is reduced, which is a considerable advantage, in particular in the field of compact motor vehicles. Due to the inclined arrangement of connecting flanges to each other for forming the degassing gap, these can be formed by curved component ridges, which in turn reduce the space required by the component.

The above-described advantages of degassing are already provided when the angle enclosed by the connecting flanges is very small, for example only 1°, preferably between 6° and 8°. The opening angle of the degassing gap should not be too large, so that a weld seam with a sufficiently deep root can be produced. Therefore, the connecting flanges for forming the degassing gap are typically not arranged at an angle to each other that exceeds 20° since the strength decreases correspondingly at larger angles.

In order to perform the laser welding method, it is not necessary for the material thickness of the connecting partners to have a certain value. Rather, this is determined by the requirements otherwise imposed on the component to be manufactured.

Investigations have shown that, when the laser beam is directed transversely with an inclination relative to the feed direction onto the connecting zone of the joints of the two connecting flanges, which are held against each other, the degassing process can be facilitated. The reason for this is presumed to be the increasing number of reflections occurring on the mutually facing surfaces of the connecting flanges in the region of the degassing gap, which cause a reduced energy loss and a correspondingly more intensive preheating before the actual melting of the metal-coated surface regions. In addition, it could be observed that with an inclined laser, the energy can be introduced deeper into the material than is the case without an inclined laser. It is assumed that the connecting flanges arranged at an angle to one another in combination with the inclined laser lead to an improved reflection behavior, which makes it possible to introduce energy deeper into the material compared to conventional methods which use the same laser power. As a result, the forming weld seam automatically draws itself into the connecting plane. In other words, between the two connecting partners arranged at an angle to one another a homogeneous weld seam is essentially formed, which corresponds to the contour profile of the connecting partners. The angle at which the laser beam is inclined transversely to the feed direction should not exceed 25°. With a stronger inclination, and with a high speed feed, the weld can sometimes not be formed with the necessary depth.

Due to the removal of the evaporation products of the metallic coating in the direction away from the surface on which the laser is applied, the laser optics and other nearby devices are also protected from weld spatter or the like. Nevertheless, it may be expedient to provide an air flow across the connecting zone, thus crossing the welding beam, through which evaporating products possibly exiting at this side are blown away and thus the laser and neighboring devices are protected against contamination.

In addition, the laser beam can be oscillated back and forth transversely to the feed direction following the longitudinal extension of the joints, as described in WO 2016/169791 A1. The longer period of time in which the molten pool is liquid, which is due to this measure, and the weld pool dynamics introduced therein, have a positive effect on preventing pore formation within the weld seam. If the laser beam is guided in an oscillating manner in a transverse direction relative to the feed direction, metal-coated steel components can also be connected with a required result, in which the metallic coating has a melting point which is above the melting point of the steel material. Due to the oscillation of the laser beam and the welding pool dynamics introduced thereby into the weld pool, the continuous phases arising from such a metallic coating during the welding process are initially destroyed and then evenly distributed and then finely dispersed within the weld seam. Typically, in such an oscillating laser beam movement, the path amplitude corresponds to about two-thirds of the joint surface width formed by the joints held against each other.

In addition to a non-leading, i. e. vertical arrangement of the laser in the feed direction, the connecting zone can also be pre-heated in the feed direction, namely by the laser beam being directed onto the connecting zone with a deviation from the vertical, in an inclined manner, in the direction of the feed direction. An inclination angle between 5° and 45° with respect to the perpendicular of the connecting zone is considered to be advantageous in this context. As a result of the angled position, the laser beam is directed with a leading orientation toward the connecting zone in the direction of the feed direction. Then, the laser beam pushes a larger heat front in front of the same, which is particularly useful when connecting metal-coated connecting partners, the metallic coating of which has an evaporation temperature that is below the melting temperature of the steel material. Then the metallic coating evaporates on the top of the joint at least as far as possible, before the steel material is melted. Overall, this reduces the incidence of the seam and improves the quality of the weld.

BRIEF DESCRIPTION OF THE DRAWINGS

The present disclosure is described in the following by means of exemplary embodiments with reference to the accompanying figures. In particular.

DETAILED DESCRIPTION

Figure 1A:
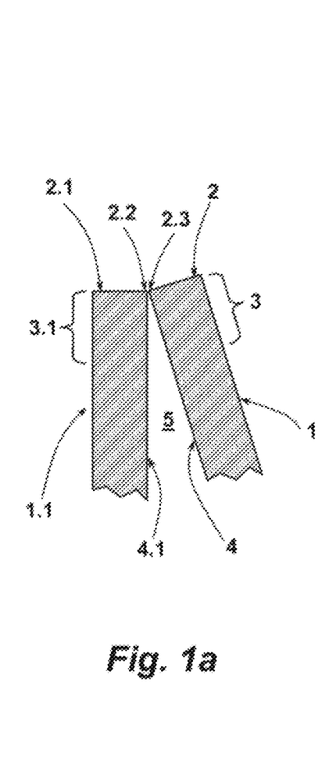
FIGS. 1a-1c show the arrangement of the connecting flanges of two connecting partners for laser welding of the end faces of joints (FIG. 1a), at the beginning of the welding process in the initial stage of formation of a weld pool at a point of the connecting zone (FIG. 1b) and at an advanced stage of the welding (FIG. 1c)

FIG. 1a shows an edge portion of two connecting partners 1, 1.1, not shown in further detail. The connecting partners 1, 1.1 are sheet steel parts, as used for the production of structural components of vehicles. The connecting partners 1, 1.1 are hot-dip galvanized and therefore carry a metallic coating, namely a zinc coating. The connecting partners 1, 1.1 are held adjacent to each other in FIG. 1a with their joints 2, 2.1 following the longitudinal extension of the component. In the arrangement of the two connecting partners shown in FIG. 1, the mutually facing joint edges 2.2, 2.3 adjoin one another. Consequently, both connecting partners 1, 1.1 are in linear contact with each other. The upper portion of the parts of the connecting partners 1.1 shown in FIG. 1a forms the connecting flanges. The extension of the connecting flanges 3, 3.1 is indicated in FIG. 1a with indented brackets. The two connecting partners 1, 1.1 are arranged at an angle of about 10° to each other to allow the above-described linear contact at the mutually facing joint edges. As a result of this arrangement, the mutually facing surfaces 4, 4.1 of the connecting partners 1, 1.1 are at an angle to one another and enclose a gap 5. The gap width increases, starting from the joint edges 2.2, 2.3, which are held against each other, in the direction away from the joints 2, 2.1.

In the arrangement of the two connecting partners 1, 1.1 shown in FIG. 1a, these are held in a clamping device, not shown in the figures, in order to weld the end faces for joining the two connecting partners 1, 1.1. Preferably, the connecting partners 1, 1.1 are held against each other so that the adjoining joint edges 2.2, 2.3 are subject to a certain bias.

Figure 1B:
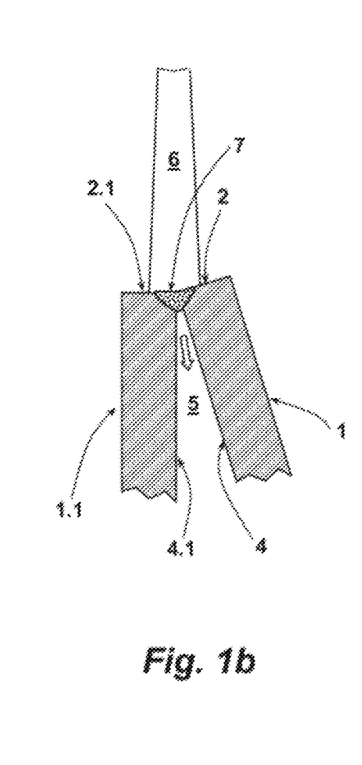

In order to connect the two connecting partners 1, 1.1 with each other, a laser beam 6 is directed onto the joints 2, 2.1 (see FIG. 1*b*). The laser beam 6 is defocused. It is also conceivable at this point, however, that the laser is focused. The diameter of the laser spot can be seen in the illustration of FIG. 1*b*. Due to the introduction of heat to the two joints 2, 2.1, the zinc coating present on the joints 2, 2.1 evaporates before the steel material begins to melt. The same applies at this point also for the case that a zinc coating is present only on the mutually facing sides 4, 4.1 of the connecting partner 1, 1.1 and is no longer present on the end faces of the joints 2, 2.1, for example, due to a previous processing step, such as a trimming of the connecting partners. The weld pool is indicated therein by the reference numeral 7. Due to the laser beam effect and the consequent sustained introduction of heat, the weld pool 7 eats its way, starting from the joints 2, 2.1, by itself into the connecting partners 1, 1.1, i. e. it finds its way automatically. The advanced deep expansion of the welding pool 7 leads to the formation of a heat front which heats the zinc coating on the mutually facing sides of the connecting partners 1, 1.1. Since the evaporation temperature of the zinc coating is below the melting temperature of the steel material, the zinc coating begins to evaporate, or this process is already completed or partially completed before the steel material melts. Due to the gap 5, which is also indicated as a degassing gap in the context of this discussion, the evaporation products of the zinc coating are carried off, following the path of least resistance. This is the path through the degassing gap 5 directed away from the weld pool 7, as indicated in FIG. 1*b* by a block arrow. Due to the removal of the evaporation products in the same direction, in which the welding zone spreads deeply into the weld seam, the same eats its way deeply almost by itself. In this method, the deep formation of the weld is not hindered by the counterflow of evaporation products of the metallic coating.

Figure 1C:
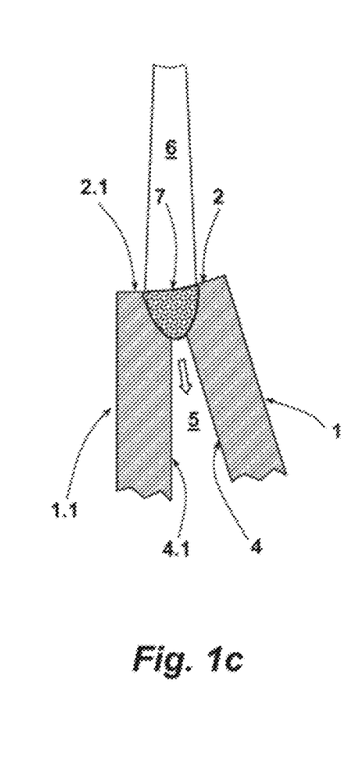

FIG. 1*c* shows the connecting zone after an almost complete welding. It can be seen that the weld pool 7 has already penetrated sufficiently deeply into the connecting partners 1, 1.1. The zinc coating on the mutually facing sides 4, 4.1 of the connecting partners 1, 1.1 continues to evaporate away from the weld pool 7 through the degassing gap 5.

Figure 2A:
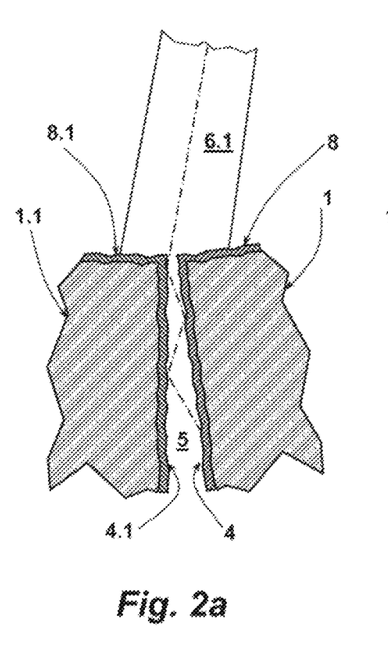
FIGS. 2a-2c show, in an enlarged sectional view, the welding process shown in FIG. 1 before the start of the melting of material (FIG. 2a), in the initial stage of the formation of the welding pool (FIG. 2b) and after the completion of the welding process (FIG. 2c)
Figure 2B:
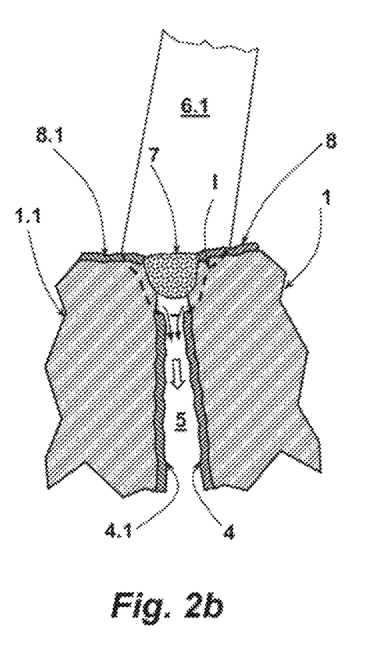
Figure 2C:
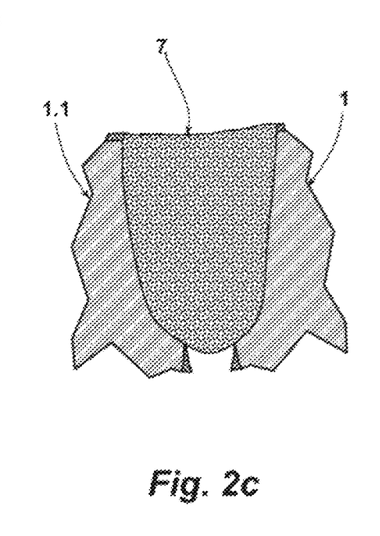

The sequence of FIGS. 2*a* to 2*c* clarifies the method described above again with reference to an enlarged detail representation of the region of the adjoining joint edges 2.2, 2.3 of the two connecting partners 1, 1.1. In contrast to the connecting method described with reference to FIGS. 1*a* to 1*c*, in the exemplary embodiment of FIGS. 2*a* to 2*c*, the laser beam 6.1 is directed in an inclined manner transversely to the two joints 2, 2.1. Although the two connecting partners 1, 1.1, as described above, adjoin each other in the region of the mutually facing joint edges 2.2, 2.3, there are actually small slit portions between the two connecting partners 1, 1.1 due to unavoidable material irregularities. As shown in FIG. 2*a*, this causes laser beam components to pass through these openings and be reflected on the mutually facing surfaces 4, 4.1 within the degassing gap 5. As a result of this penetration of laser beams onto the surfaces 4, 4.1, which is facilitated by the inclined laser beam 6.1, the zinc coating 8, 8.1 is heated on the mutually facing surfaces of the connecting partners 1, 1.1. The passage of laser beams through the unavoidable remaining gaps is ended when, as shown in FIG. 2*b*, the material begins to melt in the region of the adjoining joint edges 2.2, 2.3 and a weld pool 7 is formed. As a result of the preheating and the heat front extending around the weld pool 7, the zinc coating 8, 8.1 has already melted in the immediate vicinity of the weld pool 7 and normally evaporated either completely or at least for the most part, before the weld pool has melted in these regions with the steel material. This applies even more in the event that the zinc coating 8, 8.1 is not present or only partially present in the region of the mutually facing joint edges 2.2, 2.3 of the connecting partners 1, 1.1 and thus extends mainly on the mutually facing surfaces 4, 4.1 of the connecting partners 1, 1.1. This may be caused, for example, by previous trimming processes of the corresponding connecting partners 1, 1.1 at their end faces. In FIG. 2*b*, a dashed line indicates an isotherm I, which indicates the evaporation temperature of the zinc coating 8, 8.1. The temperature of the weld pool 7 is above the temperature of the isotherm I shown, which precedes the deep penetration of the weld pool 7. Accordingly, the zinc coating 8, 8.1 is at least partially evaporated before these parts of the steel material melt, preceding the propagation of the molten pool 7. As a result of the passage created by the degassing gap 5, the evaporation products are led away from the weld pool 7, as shown diagrammatically in FIG. 2*b*.

FIG. 2*c* shows the finished welded seam. The depth of the weld seam in the connecting partners 1, 1.1 shown in FIG. 2*c* also represents the width of the connecting flanges 3, 3.1 as part of the connecting partners 1, 1.1.

Figure 3A:
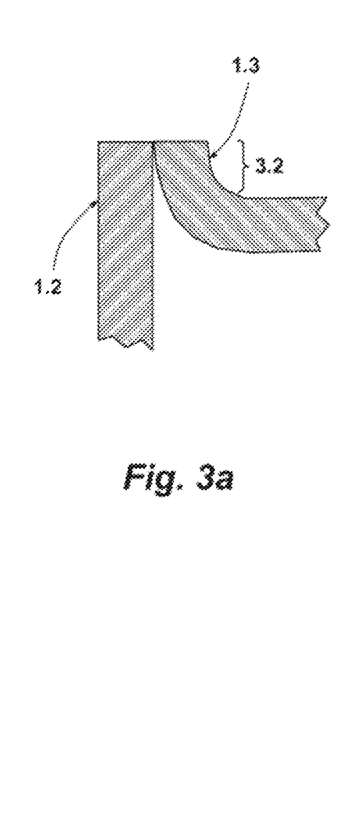
FIGS. 3a-3c show a representation of a welding corresponding to the sequence of FIGS. 1a-1c with geometrically differently designed connecting partners.
Figure 3B:
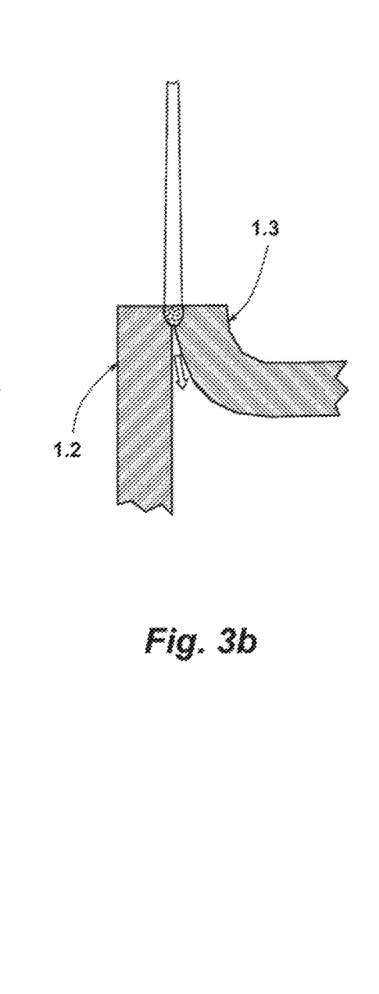
Figure 3C:
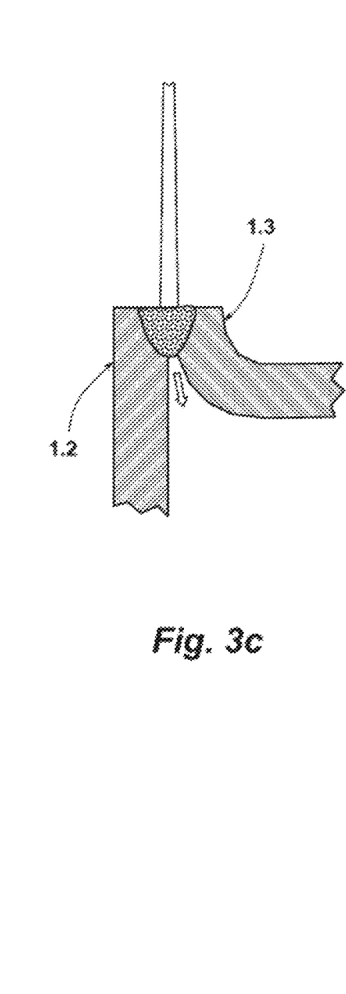

The sequence of FIGS. 3*a* to 3*c* schematically shows the connection of two further connecting partners 1.2, 1.3. While in the exemplary embodiment of the sequence of FIGS. 1*a* to 1*c*, the connecting partners 1, 1.1 were both flat and arranged at an angle to each other, in the case of the connecting partners 1.2, 1.3, the connecting partner 1.3 is curved in the region of its connecting flange 3.2. In this exemplary embodiment, the degassing gap is provided by the curved configuration of the connecting flange 3.2 of the connecting partner 1.3, in that a linear contact is formed between the connecting partners at its curved end. It is also conceivable at this point, however, that both connecting partners are curved and are respectively held against each other, facing each other, at the end of their corresponding outer radius or curved end by means of linear contact. The welding process is carried out as described for the sequence of FIGS. 1*a* to 1*c* and 2*a* to 2*c*.

Figure 4:
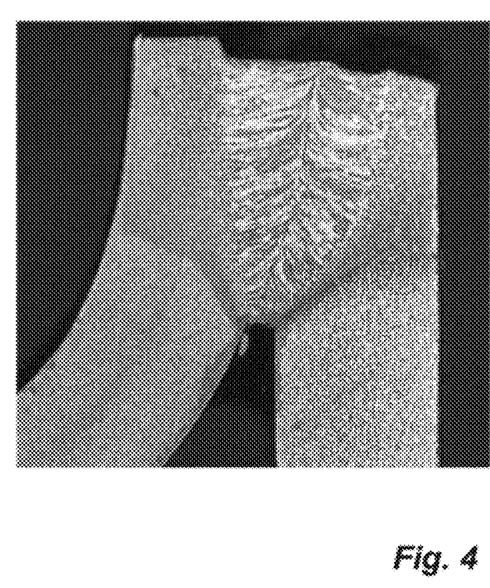
FIG. 4 shows a representation of a ground macro-sample of two connecting partners which have been connected in accordance with the welding according to FIGS. 3a-3c.

FIG. 4 shows a representation of a ground macro-sample of a weld seam which has been produced in accordance with the welding method explained in the preceding figures. The image shows that the molten material has an ideal shape and that it is pore-free.

To investigate the load-bearing capacity of such weld seams, a bumper has been produced from two zinc-coated sheet steel components welded together at the end faces. The one component is a profile having a hat-like cross section, whose open side has been closed by a steel plate. Both components have been welded together on the end faces, as described in the preceding figures. The thickness of the steel sheet components used was 2 mm. The welding depth was between 2.5 mm and 3 mm. The case studies carried out with this component with drop heights of 3 m and drop weights of more than 500 kg could not lead to the destruction of the weld seams. In all experiments, the base material failed in some places, but not the weld seam. This result was surprising, since otherwise in such components, in particular under dynamic load, the weld seam usually represents the respective weak zone.

The present disclosure has been described with reference to exemplary embodiments. Without departing from the scope of the valid claims, numerous other possible implementations of the invention are available to a person skilled in the art.

LIST OF REFERENCE NUMERALS 1, 1.1, 1.2, 1.3 connecting partner
2, 2.1 joint
2.2, 2.3 joint edge
3, 3.1, 3.2 connecting flange
4, 4.1 surface
5 gap/degassing gap
6, 6.1 laser beam
7 weld pool
8, 8.1 zinc coating
I isotherm

The invention claimed is:

1. A method for laser welding end faces of joints of two connecting flanges, which are held against each other, of two connecting partners made from a steel material, wherein at least one connecting partner of said two connecting partners is provided with a metallic coating with an evaporation temperature that is below the melting temperature of the steel material, wherein each connecting flange has two side faces which face in opposite directions and which terminate at the end face of the connecting flange, with each end face extending between the two side faces, and wherein one of the two side faces of each connecting flange is positioned facing one of the two side faces of the other connecting flange, the method comprising:

arranging the connecting flanges of the two connecting partners against each other to enclose an angle that opens pointing in a direction away from a side of the joints on which a laser irradiates a laser beam to laser weld the end faces of the joints is applied, thereby providing a degassing gap between the connecting flanges that increases in the direction of heat introduction, through which degassing gap evaporation products of the coating material resulting from the introduction of heat are carried off during the welding process;

whereby, in arranging the connecting flanges of the two connecting partners, the two connecting partners adjoin each other in a region of mutually facing joint edges of the joints, and slit openings are present between the mutually facing joint edges along the longitudinal extension of the joints; and then laser welding the end faces of the connecting flanges in a feed direction which follows the longitudinal extension of the joints, with the laser beam being directed in an inclined manner transversely to the longitudinal extension of the joints, thereby providing a weld seam in a connecting zone of the joints connecting the two connecting flanges to each other;

whereby portions of the laser beam pass through the slit openings and are reflected on the mutually facing side faces of the two connecting flanges within the degassing gap, thereby heating the metallic coating of the at least one connecting partner of said two connecting partners in regions within the degassing gap such that at least a majority metallic coating melts or evaporates at least for the most part, before a weld pool has melted with the steel material in said regions within the degassing gap.

2. The method of claim 1, wherein the connecting flanges are held in a linear contact against each other in the region of their mutually facing joint edges for performing the laser welding.

3. The method of claim 1, wherein the connecting flanges are held at an angle between 1° and 20° inclined to each other.

4. The method of claim 1, wherein a laser spot of the laser beam incident on the joints is set with a diameter which is greater than a maximum gap width between the connecting flanges in the region of the joints, which are held against each other, wherein the width of the degassing gap increases starting from the maximum gap width.

5. The method of claim 1, wherein the laser beam is transversely inclined at an inclination angle which is not greater than 25 degrees.

6. The method of claim 1, wherein an air flow flowing transversely with respect to the direction of the laser beam and guided by the laser beam is provided on that side of the joint on which the laser beam is applied.

7. The method of claim 1, wherein the laser beam is oscillated back and forth transversely to the feed direction following the longitudinal extension of the joints.

8. The method of claim 7, wherein the oscillation frequency of the laser beam does not exceed 1000 Hz.

9. The method of claim 7, wherein a path amplitude of the oscillation movement of the laser beam does not exceed two thirds of the joint surface width formed by the joints, which are held against each other.

10. The method of claim 1, wherein the connecting zone of the joints intended for melting is gradually preheated in the feed direction before melting.

11. The method according of claim 10, wherein the laser beam is directed with a leading orientation onto the connecting zone at an angle between 5° and 45° with respect to the perpendicular.

12. The method of claim 1, wherein the metallic coating of the at least one connecting partner is a zinc coating.

13. The method of claim 1, wherein the width of the connecting zone to be melted is smaller than the width of a joint surface formed by the joints held against each other, and the laser beam is guided in such a way that, at both joints, an outer edge region for forming a respective weld pool support is not melted.

* * * * *